(12) United States Patent
Jayawardena et al.

(10) Patent No.: US 10,210,447 B2
(45) Date of Patent: Feb. 19, 2019

(54) ASSET TRACKING USING VISIBLE LIGHT COMMUNICATION

(71) Applicant: Cooper Technologies Company, Houston, TX (US)

(72) Inventors: Adikaramge Asiri Jayawardena, Manlius, NY (US); Joseph Michael Manahan, Manlius, NY (US)

(73) Assignee: Cooper Technologies Company, Houston, TX (US)

(*) Notice: Subject to any disclaimer, the term of this patent is extended or adjusted under 35 U.S.C. 154(b) by 29 days.

(21) Appl. No.: 15/612,547

(22) Filed: Jun. 2, 2017

(65) Prior Publication Data

US 2017/0351946 A1    Dec. 7, 2017

Related U.S. Application Data

(60) Provisional application No. 62/344,499, filed on Jun. 2, 2016.

(51) Int. Cl.
*H04B 10/00* (2013.01)
*G06K 19/07* (2006.01)
*G06Q 10/08* (2012.01)
*H04B 10/116* (2013.01)
(Continued)

(52) U.S. Cl.
CPC ....... *G06K 19/0728* (2013.01); *G06Q 10/087* (2013.01); *H04B 10/116* (2013.01); *G06K 19/0716* (2013.01); *G06K 19/07758* (2013.01)

(58) Field of Classification Search
CPC .................................................. H04B 10/116
See application file for complete search history.

(56) References Cited

U.S. PATENT DOCUMENTS

2009/0184648 A1    7/2009   Colak et al.
2012/0089325 A1    4/2012   Won et al.
(Continued)

FOREIGN PATENT DOCUMENTS

WO    2015139159    9/2015

OTHER PUBLICATIONS

O. Tsykanovskaya, International Search Report and Written Opinion issued in application No. PCT/US2017/035717, completion date Aug. 9, 2017, dated Sep. 14, 2017, 7 pages, Federal Institute of Industrial Property, Moscow, Russia.

*Primary Examiner* — Daniel Dobson
(74) *Attorney, Agent, or Firm* — King & Spalding LLP

(57) ABSTRACT

A system for locating an asset can include a first visible light communication (VLC) device having a first controller, a first transceiver, and a first light source, where the first transceiver has a first range, where the first controller broadcasts, using the first transceiver, a first communication signal, where the first communication signal comprises an identification of the asset. The system can also include an asset communication device associated with the asset, where the asset communication device includes a second transceiver and a second controller, where the second transceiver has a second range, where the asset communication device is within the first range, where the second controller broadcasts, using the second transceiver, a second communication signal in response to the first communication signal, where the second communication signal comprises the identification of the asset.

20 Claims, 7 Drawing Sheets

(51) Int. Cl.
*H04J 14/00* (2006.01)
*G06K 19/077* (2006.01)

(56) References Cited

U.S. PATENT DOCUMENTS

| | | | |
|---|---|---|---|
| 2014/0270798 A1* | 9/2014 | Manahan | H04B 10/116 398/130 |
| 2014/0341588 A1* | 11/2014 | Pederson | H04B 10/40 398/128 |
| 2015/0147067 A1 | 5/2015 | Ryan et al. | |
| 2015/0282282 A1 | 10/2015 | Breuer et al. | |

\* cited by examiner

ASSET TRACKING USING VISIBLE LIGHT COMMUNICATION

CROSS-REFERENCE TO RELATED APPLICATIONS

This application claims priority under 35 U.S.C. § 119 to U.S. Provisional Patent Application Ser. No. 62/344,499, titled "Asset Tracking Using Visible Light Communication" and filed on Jun. 2, 2016, the entire contents of which are hereby incorporated herein by reference.

TECHNICAL FIELD

Embodiments described herein relate generally to visible light communication (VLC), and more particularly to systems, methods, and devices for VLC networks in various locations.

BACKGROUND

Visible light communication is a way of allowing devices to communicate with each other using signals embedded within a light output generated by a light source. For example, a light source can receive power and generate a light output. The power received by the light source can include a visible light signal generated by a modulation circuit. When the light source illuminates using the power it receives (including the visible light signal), the light source sends light output (sometimes called a light communication). The light output of the light source can include a visible light communication (VLC) signal and can be received by a receiver. In such a case, the receiver can separate the VLC signal from the light output.

In hazardous locations, communication of a condition (e.g., the status of certain equipment, the location of a person) in the hazardous location can be important. Failure to timely address a situation where equipment is not operating properly, or to locate people in an emergency situation, can result in a loss of material, a loss of time, a loss of equipment, and, in extreme cases, a loss of life. Thus, communication in hazardous locations can be important. However, communication in such hazardous locations can be impaired because of noise, humidity, extreme temperatures, chemical exposure, vibrations, and/or other conditions that are commonly present in hazardous locations.

SUMMARY

In general, in one aspect, the disclosure relates to a system for locating an asset. The system can include a first visible light communication (VLC) device that includes a first controller, a first transceiver, and a first light source, where the first transceiver has a first range, where the first controller broadcasts, using the first transceiver, a first communication signal, where the first communication signal comprises an identification of the asset. The system can also include an asset communication device associated with the asset, where the asset communication device includes a second transceiver and a second controller, where the second transceiver has a second range, where the asset communication device is within the first range, where the second controller receives, using the second transceiver, the first communication signal, where the second controller broadcasts, using the second transceiver, a second communication signal in response to the first communication signal, where the second communication signal comprises the identification of the asset. The first controller can receive, using the first transceiver, the second communication signal. At least one of the first communication signal and the second communication signal can be among multiple VLC signals.

In another aspect, the disclosure can generally relate to an asset communication device associated with an asset. The asset communication device can include a light source and a controller that determines when to send a first visible light communication (VLC) signal. The asset communication device can also include a VLC signal generator coupled to the controller, where the VLC signal generator generates the first VLC signal based on instructions received from the controller. The asset communication device can further include a transceiver coupled to the VLC signal generator, where the transceiver broadcasts the first VLC signal using the light source, where the first VLC signal comprises an identification of the asset. The first VLC signal can be configured to be received by a first VLC device comprising a second transceiver, where the first VLC device can determine, based on the first VLC signal received by the VLC device, a location of the asset.

In yet another aspect, the disclosure can generally relate to a visible light communication (VLC) device. The VLC device can include a light source and a controller that determines when to send a first visible light communication (VLC) signal. The VLC device can also include a VLC signal generator coupled to the controller, where the VLC signal generator generates the first VLC signal based on instructions received from the controller. The VLC device can further include a transceiver coupled to the VLC signal generator, where the transceiver broadcasts the first VLC signal using the light source, where the first VLC signal is addressed to an asset and requests a return communication signal from the asset, where the transceiver is configured to receive the return communication signal, where the controller can determine, based on the return communication signal, a location of the asset.

These and other aspects, objects, features, and embodiments will be apparent from the following description and the appended claims.

BRIEF DESCRIPTION OF THE DRAWINGS

The drawings illustrate only example embodiments of VLC networks in a volume of space and are therefore not to be considered limiting of its scope, as VLC networks in a volume of space may admit to other equally effective embodiments. The elements and features shown in the drawings are not necessarily to scale, emphasis instead being placed upon clearly illustrating the principles of the example embodiments. Additionally, certain dimensions or positionings may be exaggerated to help visually convey such principles. In the drawings, reference numerals designate like or corresponding, but not necessarily identical, elements.

DETAILED DESCRIPTION OF EXAMPLE EMBODIMENTS

Figure 1:
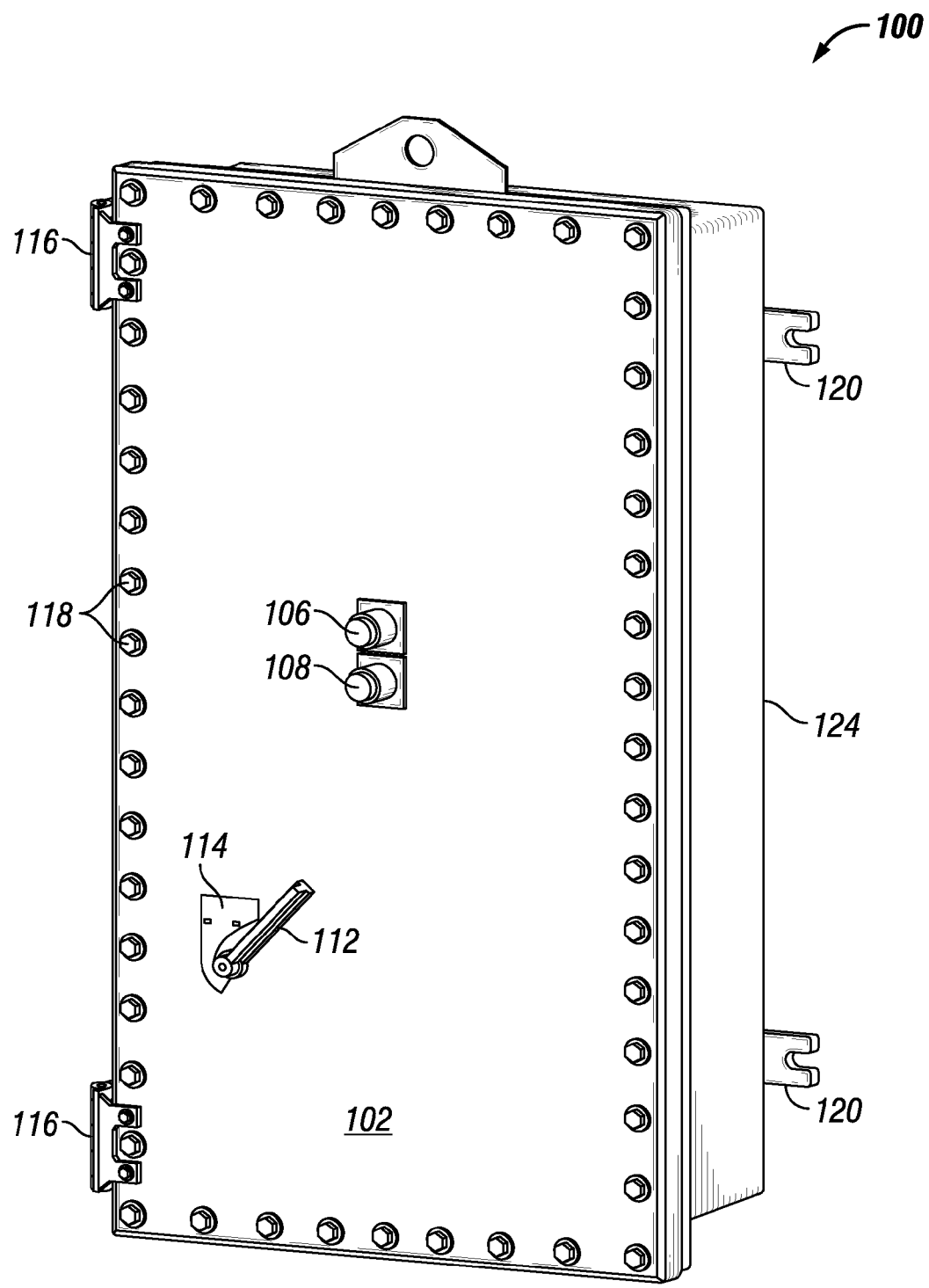
FIG. 1 shows an enclosure in which one or more example embodiments of VLC networks may be implemented.

The example embodiments discussed herein are directed to systems, methods, and devices for asset tracking using VLC, either in whole or in part. In other words, asset tracking described herein requires two-way communication, and at least one direction of that communication uses VLC. In some cases, example embodiments may be directed to tracking one or more assets using VLC in a volume of space to communicate a location of those assets in the volume of space. For example, asset tracking using VLC can be used entirely within a volume of space. Asset tracking using VLC can be used in a combination of one or more hazardous locations and/or one or more non-hazardous locations. Further, example embodiments can coordinate a network of light sources, modulation circuits, and communication devices.

While example embodiments are described herein as using VLC networks, other wireless communication networks can be used as a supplement or an alternative to a VLC network. For example, example embodiments can use LiFi in addition to VLC. Certain example embodiments provide a number of benefits. Examples of such benefits include, but are not limited to, tracking of personnel, emergency response, inventory management, and productivity analysis.

Example embodiments of asset tracking using VLC networks can be directed to one or more of a number of different types of light source, including but not limited to light-emitting diode (LED) light sources, fluorescent light sources, organic LED light sources, incandescent light sources, and halogen light sources. Therefore, example embodiments asset tracking using VLC networks described herein, even in hazardous locations, should not be considered limited to a particular type of light source.

In some cases, example embodiments described herein can be directed to hazardous locations. As defined herein, a hazardous location is any location where the enclosure can be exposed to extreme conditions. Extreme conditions can include, but are not limited to, high temperatures, low temperatures, temperature fluctuations, corrosion, humidity, chemicals, vibrations, and dust. The example enclosures discussed herein can be one or more of a number of different types of enclosures, including but not limited to explosion-proof enclosures, junction boxes, control panels, plugs/receptacles, lighting panels, lighting devices, motor control centers, switchgear cabinets, relay cabinets, and/or any other type of enclosure that can be used in a VLC network in a hazardous location. More information about hazardous locations and hazardous location enclosure can be found in Articles 500-506 and Articles 510-517 of the National Electric Code, which is incorporated herein by reference.

A user may be any person that interacts with a assets located in a volume of space. Specifically, a user may program, operate, and/or interface with one or more components (e.g., a controller) associated with a VLC network. Examples of a user may include, but are not limited to, an engineer, an electrician, an instrumentation and controls technician, a mechanic, an operator, a consultant, a property manager, an inventory department, a health and safety department, a contractor, an asset, a network manager, and a manufacturer's representative.

As defined herein, an asset can be any unit or group of units. An asset can move on its own, is capable of being moved, or is stationary. Examples of an asset can include, but are not limited to, a person (e.g., a user, a visitor, an employee), a part (e.g., a motor stator, a cover), a piece of equipment (e.g., a fan, a container), or a group of parts of equipment (e.g., a pallet stacked with chemical containers).

In the current art, asset tracking is performed in non-hazardous environments. These currently-known asset tracking systems use technologies that include Wifi, RFID, Bluetooth beacons, and global positioning systems (GPS). These technologies used in currently-known asset tracking systems are less effective than example embodiments described herein, particularly in hazardous environments (e.g., because of costs, because of signal interference). For instance, example embodiments are easy to integrate into existing infrastructures, and there is no need for battery-powered RF spots or beacons.

Further, example embodiments provide high locational accuracy (as compared, for example, to using GPS). In addition, example embodiments, provide a high level of data security if such security is desired by a user. Example embodiments are also more reliable. For instance, example embodiments do not contend with electromagnetic interference or other issues that can affect the performance of wireless technologies. Example embodiments also provide for large bandwidths and long ranges (distances), overcoming limitations that can be encountered using RFID and WiFi.

As defined herein a VLC device is any device that is capable of sending a VLC signal while receiving some other type (e.g., radio frequency (RF)) of communication signal, receiving a VLC signal while sending some other type of communication signal, or both sending and receiving a VLC signal. In other words, a VLC device uses VLC, to some minimal extent, in example embodiments described herein. When communication signals (e.g., VLC signals) are transmitted between a VLC device and an asset, the first communication signal can be referred to herein as an initial communication signal, and a second communication signal, if any, sent in response to the first communication signal, can be referred to herein as a response communication signal.

Example embodiments of tracking assets using VLC networks in volumes of space will be described more fully hereinafter with reference to the accompanying drawings, in which example embodiments of tracking assets using VLC networks in volumes of space are shown. Tracking assets using VLC networks in volumes of space may, however, be embodied in many different forms and should not be construed as limited to the example embodiments set forth herein. Rather, these example embodiments are provided so that this disclosure will be thorough and complete, and will fully convey the scope of tracking assets using VLC networks in volumes of space to those or ordinary skill in the art. Like, but not necessarily the same, elements (also sometimes called components) in the various figures are denoted by like reference numerals for consistency.

Terms such as "first", "second", "third", and "within" are used merely to distinguish one component (or part of a component or state of a component) from another. Such terms are not meant to denote a preference or a particular orientation, and are not meant to limit example embodiments described herein. In the following detailed description of the example embodiments, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

FIG. 1 shows an enclosure 100 (a type of VLC device) with which one or more example embodiments of tracking assets using VLC networks may be implemented. In one or more example embodiments, one or more of the components shown in FIG. 1 may be omitted, repeated, and/or substituted. Accordingly, example embodiments of an enclosure should not be considered limited to the specific arrangements of components shown in FIG. 1.

Referring now to FIG. 1, the enclosure 100 is an example of a hazardous location enclosure 100 in a closed position is shown. The enclosure cover 102 is secured to the enclosure body 124 by a number of fastening devices 118 located at a number of points around the perimeter of the enclosure cover 102. In one or more example embodiments, a fastening device 118 may be one or more of a number of fastening devices, including but not limited to a bolt (which may be coupled with a nut), a screw (which may be coupled with a nut), and a clamp.

In addition, one or more hinges 116 are secured to one side of the enclosure cover 102 and a corresponding side of the enclosure body 124 so that, when all of the fastening devices 118 are removed, the enclosure cover 102 may swing outward (i.e., an open position) from the enclosure body 124 using the one or more hinges 116. In one or more example embodiments, there are no hinges, and the enclosure cover 102 is separated from the enclosure body 124 when all of the fastening devices 118 are removed. The enclosure cover 102 and the enclosure body 124 may be made of any suitable material, including metal (e.g., alloy, stainless steel), plastic, some other material, or any combination thereof. The enclosure cover 102 and the enclosure body 124 may be made of the same material or different materials.

In one or more example embodiments, on the end of the enclosure body 124 opposite the enclosure cover 102, one or more mounting brackets 120 are affixed to the exterior of the enclosure body 124 to facilitate mounting the enclosure 100. Using the mounting brackets 120, the enclosure 100 may be mounted to one or more of a number of surfaces and/or elements, including but not limited to a wall, a control cabinet, a cement block, an I-beam, and a U-bracket.

The enclosure cover 102 may include one or more features that allow for user interaction while the enclosure 100 is sealed in the closed position. As shown in FIG. 1, one or more light sources (e.g., indicating light 230, indicting light 108) may be located on the enclosure cover 102. Each indicating light may be used to indicate a location of one or more assets located inside and/or communicably coupled to (e.g., within a line of sight of, within range of) the enclosure 100. For example, a light source may transfer data measured by one or more sensors within the enclosure 100. As another example, a light source may transfer data that discloses the location of one or more assets proximate to the enclosure 100. A light source may be made of one or more materials (e.g., glass, plastic) using one or more of a number of different lighting sources (e.g., light-emitting diode (LED), incandescent bulb).

In one or more example embodiments, the enclosure cover 102 may also include one or more of a number of other features, including but not limited to a switch handle 112, a viewing window, a meter, a digital display, and a pushbutton. Regardless of the existence or absence of such features, the hazardous location enclosure 100 (or any other type of enclosure) used in conjunction with an example VLC network in a volume of space includes at least one indicating light.

Figure 2:
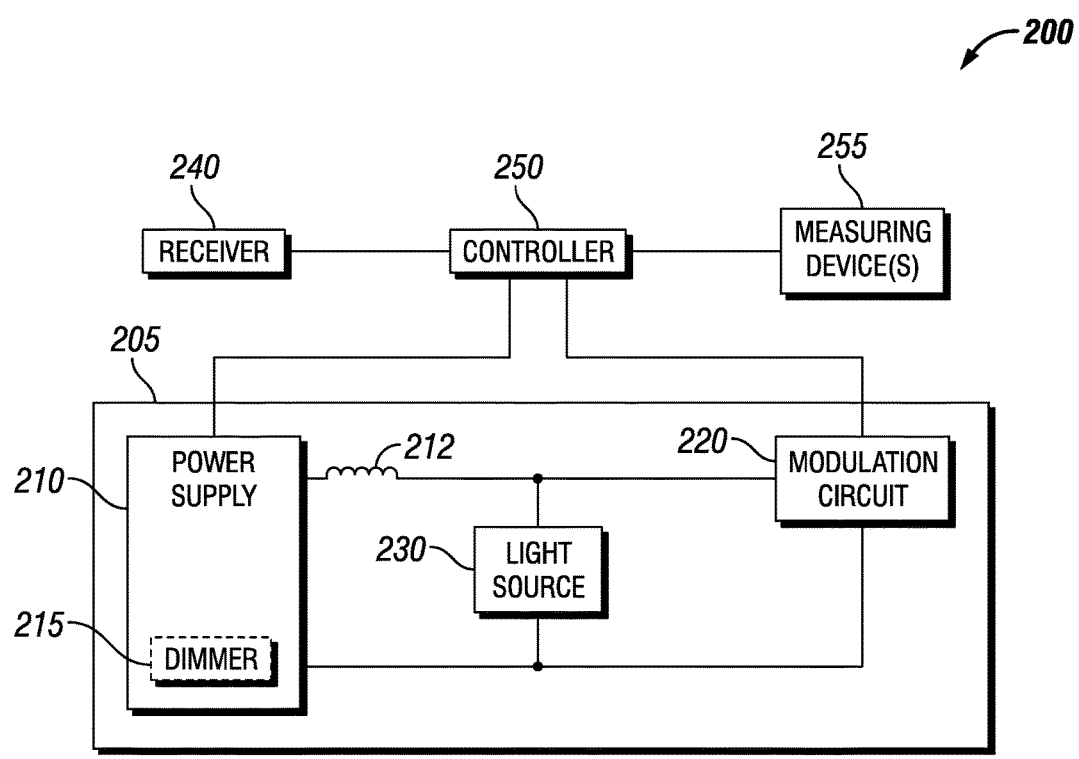
FIG. 2 shows a system diagram of a VLC device in a volume of space in accordance with certain example embodiments.

FIG. 2 shows a system diagram of a VLC device 200 located in a volume of space in accordance with certain example embodiments. The VLC device 200 includes a lighting circuit 205, a transceiver 240, a controller 250, and one or more measuring devices 255. The lighting circuit 205 of FIG. 2 includes a power supply 210, a modulation circuit 220, one or more light sources 230, and an inductor 212. The power supply 210 can optionally include a dimmer 215. In one or more example embodiments, one or more of the components shown in FIG. 2 may be omitted, repeated, and/or substituted. Accordingly, example embodiments of a VLC structure for an enclosure in a volume of space should not be considered limited to the specific arrangements of components shown in FIG. 2.

As an example, the VLC device 200 may additionally have the capability of sending and/or receiving some other type of communication signal (radio frequency signal) aside from a VLC signal. In such a case, the VLC device 200 can include one or more other components (e.g., an antenna). In addition, or in the alternative, the controller 205 of the VLC device can perform a number of other functions to be capable of sending and/or receiving such other communication signals. In any case, the example VLC device 200 can at least send a VLC signal, receive a VLC signal, or both send and receive a VLC signal.

Referring to FIG. 2, in certain example embodiments, the power supply 210 and the modulation circuit 220 are both connected in parallel with the light source 230 to form the lighting circuit 205. In certain embodiments, one or more of a number of other components (e.g., an inductor 212, a capacitor, a resistor, a switch, an integrated circuit) can be used in the lighting circuit 205 between the power supply 210, the modulation circuit 220, and/or the light source 230.

The transceiver 240 is a device that receives the VLC signal (or other communication signal), emitted as part of the light output generated by a light source of a different VLC device. The VLC signal or other communication signal is then interpreted by the controller 250. The transceiver 240 can also send a VLC signal or other communication signal. The transceiver 240 of the VLC device 200 can be a stand-alone device that is physically separate from the VLC device 200, but within a line of sight (also called a range) of the light emitted from the light source of an adjacent VLC device. An example of a transceiver 240 is an optical sensor (e.g., a photocell). The transceiver 240 can search for a light output (and, thus, a VLC signal) on a regular basis (e.g., constantly, every 30 seconds), based on the occurrence of some event (e.g., the start of a piece of equipment), and/or based on some other factor. For example, a transceiver 240 can activate whenever it senses a light signal, and it can also decode the message embedded in the light signal.

In certain example embodiments, the transceiver 240 and the modulation circuit 220 are communicably coupled to the controller 250 so that the modulation circuit 220 generates a visible light signal based on a VLC signal received by the transceiver 240. As such, the VLC device 200 can act as a relay in a series of devices in a VLC network, as described below with respect to FIG. 3.

The light source 230 can be part of a light fixture or stand-alone. The light source 230 can be one or more light sources of any type of light source. In a VLC network, each light source can be of the same or a different type of light source from the other light sources in the VLC network. The light source 230, the power supply 210, the dimmer 215, the transceiver 240, the controller 250, the measuring devices 255, and the modulation circuit 220 can be positioned within the same housing and/or in separate locations. The light source 230 can emit light output when current flows through the light source. Such a light output can include a non-VLC signal component (or, more simply, a non-VLC signal) and, in some embodiments, a VLC signal component (or, more simply, a VLC signal). The light output of the light source 230 can be detected by a receiver of one or more adjacent VLC devices.

In certain example embodiments, the power supply 210 is a device or series of components that supply power to the light source 230. Specifically, the power supply 210 receives power from a source, processes the power, and delivers the processed power to the light source 230. The power supply 210 can also receive, process, and/or deliver control signals to the light source 230. The control signals and/or processed power (collectively referred to as a power signal) can be received by the light source 230 from the power supply 210 using wired and/or wireless technology. Similarly, the signals (e.g., power, control) received by the power supply 210 from external sources can be received using wired and/or wireless technology.

The power supply 210 can be located inside of a housing, coupled to an exterior surface of such a housing, or positioned remotely from such a housing of the VLC device 200 (e.g., an enclosure, a light fixture, a junction box). The power supply 210 can include one or more discrete components (e.g., transformer, resistor, relay), one or more hardware processors, any other suitable circuitry, or any combination thereof. Thus, the power supply 210 can include software, hardware, or any combination thereof. In certain circuits (e.g., when the light source 230 is a LED), the power supply 210 can be called a driver or a LED driver. The power supply 210 can manipulate power in any of a number of ways, including but not limited to transformation (e.g., direct current (DC) to DC, alternating current (AC) to AC), inversion (e.g., DC to AC), and conversion (e.g., AC to DC). When the power supply 210 is configured as a DC to DC converter, the modulation circuit 220 can be coupled to both the input and the output of the power supply 210.

The optional dimmer 215 of the power supply 210, if included, can control the amount of power (adjusts the power signal) delivered by the power supply 210 to the light source 230. The dimmer 215 can be controlled remotely by a user and/or by some other source. By controlling the power signal delivered by the power supply 210 to the light source 230, the dimmer 215 controls the amount of light output by the light source 230. The dimmer 215 can be part of the power supply 210, or the dimmer 215 can be a separate device from the power supply 210.

The modulation circuit 220 controls the VLC signal component of the light emitted by the light source 230. Specifically, the modulation circuit 220 sends, in parallel with the power signal sent by the power supply 210, a varying amount of power (the visible light signal) to the light source 230. The visible light signal generated by the modulation circuit 220 can be set at a different frequency (e.g., greater than one GHz, greater than one kHz) relative to the frequency (e.g., 120 Hz) of the power signal generated by the power supply 210. The power signal sent by the power supply 210 to the light source 230 is added to the visible light signal sent by the modulation circuit 220 to the light source 230, and the light source 230 emits light based on the sum of the power signal received from the power supply 210 and the visible light signal received from the modulation circuit 220. In such a case, the light emitted by the light source can include a VLC signal component. The modulation circuit 220 can be part of the power supply 210, or the modulation circuit 220 can be a separate device from the power supply 210. As an example, output current of a power supply 210 (e.g., an LED driver) is modulated in the kHz/MHz or GHz range, and data is digitized into that modulated signal by the modulation circuit 220. Additional data could also be embedded in the modulated current signal by varying its modulated frequency.

Variations (e.g., frequency, wavelength, amplitude) in the signal (also called a visible light signal) sent by the modulation circuit 220 to the light source 230 translates directly into the VLC signal as output by the light source 230. In other words, the power signal received by the light source 230 from the power supply 210 is constant, regardless of whether a dimmer 215 is present in the lighting circuit 205. Put another way, the dimmer 215 is used to control the amount of power signal delivered by the power supply 210 to the light source 230, and is not used in the VLC functionality of the modulation circuit 220. In some cases, the VLC signal sent by the modulation circuit 220 can only be sent if the dimmer 215 is set at or above some minimal dimming level. For example, the dimmer 215 can set the intensity of the light source 230 by changing the amplitude of the current. However, the modulated current signal generated by the modulation circuit 220 can still transfer the data even though its DC-offset is less.

In certain example embodiments, the modulation circuit 220 operates at a modulation level, which is the maximum amplitude of the visible light signal sent by the modulation circuit 220 to the light source 230. The modulation level of the modulation circuit 220 is typically a very small amount (e.g., less than 30%) compared to the amplitude of the power signal sent by the power supply 210 to the light source 230. For example, if the power signal delivered by the power supply 210 to the light source 230 is 1.0 A, then the modulation level of the modulation circuit 220 can be less than approximately 20 mA.

If the modulation level of the visible light signal delivered by the modulation circuit 220 to the light source 230 is too large (e.g., greater than approximately 2% of the amplitude of the power signal sent by the power supply 210 to the light source 230), then the light emitted by the light source 230 can have a flicker discernable by the human eye. Thus, because the modulation level generated by the modulation circuit 220 is so low relative to the amplitude of the power signal delivered by the power supply 210 to the light source 230, the signal-to-noise ratio (SNR) of the VLC signal of the light output of the light source 230 can be low.

In certain example embodiments, the controller 250 is communicably coupled to the optional dimmer 215, the modulation circuit 220, the power supply, and the transceiver 240. The controller 250 can include software and/or hardware. Examples of such hardware can include, but are not limited to, an integrated circuit, a programmable logic controller, one or more discrete components (e.g., resistor, capacitor), and one or more switches. The controller 250 can include, or be operatively coupled to, a timer. The optional timer can be used to track one or more periods of time, to clock a frequency (as for the visible light signal and/or the power signal), for some other purpose, or any combination thereof.

The controller 250 can determine a condition of an electrical device and/or the occurrence of an event located within or proximate to the VLC device 200. As such, one or more measuring devices 255 (e.g., temperature sensors, relay signals, smoke detectors, pressure sensors, volt meters, ammeters, infrared (IR) detector) can be communicably coupled to the controller 250. In such a case, the controller 250 can create a VLC signal and instruct the modulation circuit 220 to send a corresponding visible light signal to be sent to the light source 230. The controller 250 can also initiate, directly or indirectly, the power supply 210 (with or without the dimmer 215) to send a power signal to the light source 230.

When the transceiver 240 receives a VLC signal, the controller instructs the modulation circuit 220 to send a corresponding visible light signal to be sent to the light source 230. Similarly, the controller 250 can also initiate, directly or indirectly, the power supply 210 (with or without the dimmer 215) to send a power signal to the light source 230. In certain example embodiments, the controller 250 uses one or more of a number of protocols and/or algorithms to determine, based on a reading from one or more measuring devices 255, a condition in the volume of space. Further, the controller can use one or more protocols that are used to communicate a VLC signal within the VLC network. Such protocols and/or algorithms can be stored in memory on the controller 250. Such protocols and/or algorithms can be updated by a user, automatically, or by some other source on any random or fixed time interval.

The visible light signal generated by the modulation circuit 220 can come in one or more of a number of formats that conform to a VLC protocol. Examples of such formats can include, but are not limited to, a binary system, frequency, and wavelength. As a specific example, when the modulation level of the modulation circuit 220 is 20 mA, the VLC protocol can operate on a binary system (zeros and ones), and so the visible light signal can be zero (to correspond to a binary zero) or 20 mA (to correspond to a binary one). The VLC protocol can be communicated between, and followed by, the modulation circuit 220, the transceiver 240, and the controller 250 that initiates the VLC signal. The modulation circuit 220 can generate visible light signals that are superimposed with light waves generated by a light source 230 that uses AC or DC power.

Figure 3:
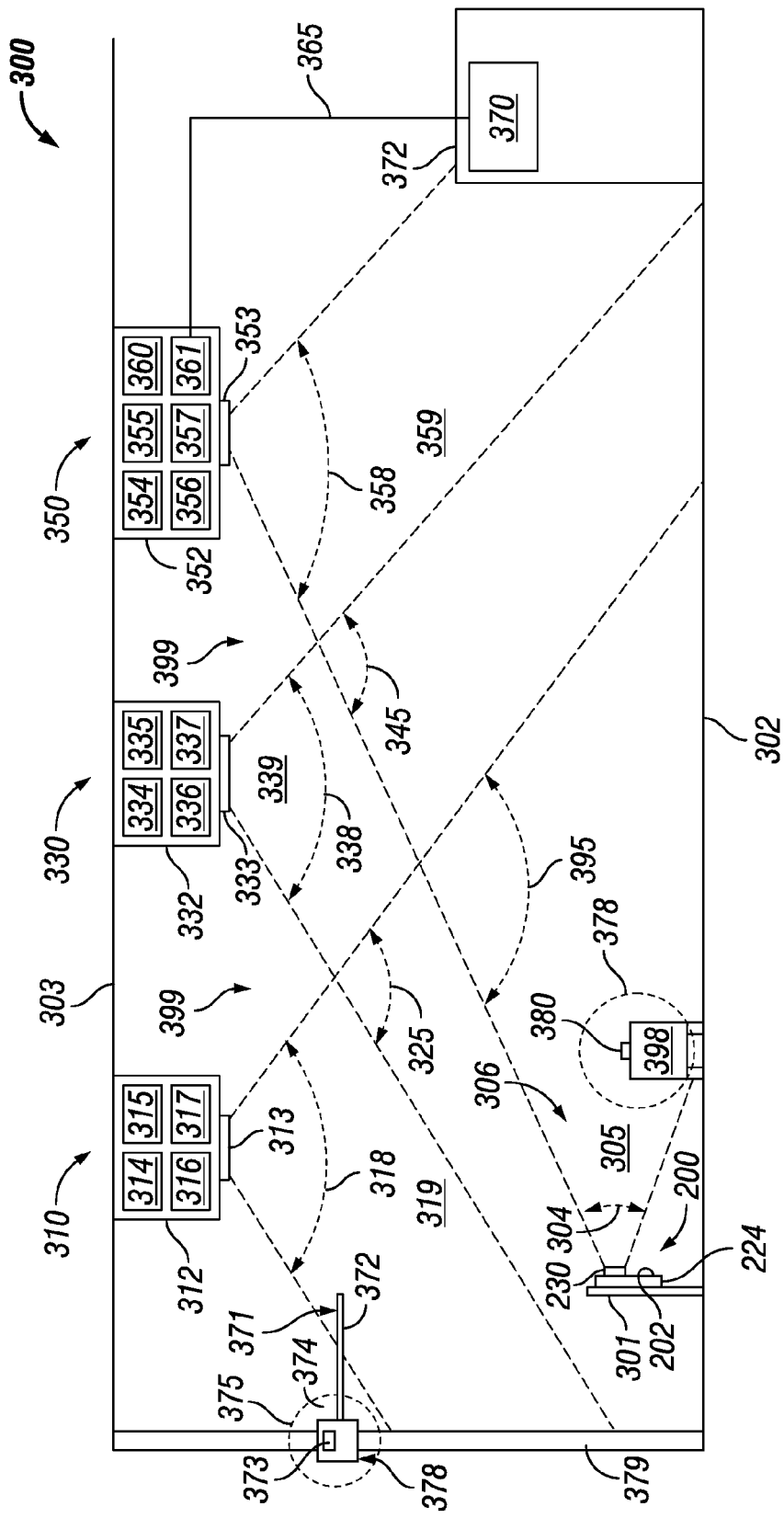
FIG. 3 shows a VLC network in a volume of space in accordance with certain example embodiments.

FIG. 3 shows a VLC network 300 in a volume of space 399 in accordance with certain example embodiments. If the volume of space 399 is a hazardous location, then the volume of space can include one or more of the hazardous conditions, described above. In one or more example embodiments, one or more of the components shown in FIG. 3 may be omitted, repeated, and/or substituted. Accordingly, example embodiments of a VLC network should not be considered limited to the specific arrangements of components shown in FIG. 3. For example, the elements (e.g., receiver, modulation circuit, controller, power supply, translation module, communication module) shown in a VLC device in FIG. 3 can be discrete elements or combined with one or more other elements of the VLC device. As another example, one or more of the elements shown in FIG. 3 to be located inside of a VLC device can be located outside (e.g., disposed on, remotely from) the VLC device.

Referring to FIGS. 1-3, the VLC network 300 of FIG. 3 includes a VLC device 200, a VLC device 310, a VLC device 330, a VLC device 378, an asset 398, a VLC device 350, and a network manager 370. The example VLC device 200 of FIG. 3 is substantially similar to the VLC device 200 described above with respect to FIG. 2. In this case, the VLC device 200 of FIG. 3 includes an light source 230 that is disposed on the cover 202 of the VLC device 200. The cover 202 is mechanically coupled to the body 224 of the VLC device 200. The body 224 of the VLC device 200 is mounted to a post 301 in the volume of space 399. In certain example embodiments, the VLC device 200 can be any type of device from which a light source (e.g., the light source 230) can illuminate and direct light away from the VLC device.

The light source 230 can, in certain circumstances and/or under certain conditions, illuminate. Alternatively, the light source 230 can always be illuminated. The light source 230 can enter one or more of a number of different modes of operation (e.g., flashing at constant and/or variable intervals, constantly on). A mode of operation of the light source 230 can change based on one or more of a number of events, including but not limited to the passage of time, a change in operation of an electrical device, and an emergency condition.

The VLC device 200 can include a controller 250 (not shown) that is communicably coupled to one or more measurement devices 255 (not shown). Each measurement device can be located inside of our outside body 224 the VLC device 200. In addition, the VLC device 200 can include, or have feeding therethrough, a source of power and/or control for one or more electrical devices. The electrical device can be any device that uses electricity to operate. Examples of such electrical devices can include, but are not limited to, a motor, a relay, a control system, a meter, a measuring device, a personal digital assistant (PDA), and a light source 230.

For example, if the electrical device is a PDA (or some other type of personal safety monitor) that is approved for use in the volume of space 399 (e.g., a hazardous environment), the PDA can be used to communicate (e.g., by modulating a flash of the light emitted from a light source) to the VLC network 300. In such a case, the PDA can provide control input (e.g., set dimming levels) to a lighting system (and/or other VLC devices) in the volume of space 399. Similarly, by using an optical sensor (a type of receiver), the PDA can receive output from the visible light network in real-time. For example, the PDA can be used within the VLC network 300 to identify specific light fixtures in the volume of space 399 that may require maintenance. In certain example embodiments, individuals carrying such a PDA within the volume of space 399 that is a hazardous environment can be informed in real-time, using the PDA and the VLC network 300, whether a hazardous condition has changed and/or to receive important information about a hazardous condition in the volume of space 399. In such a case, the PDA can also be a type of VLC device.

In certain example embodiments, the light source 230 or a component of the VLC device 200 that is communicably coupled to the light source 230 includes a receiver (not shown). The VLC device 200 can include a modulation circuit (not shown) that controls the input signal flowing through the light source 230 to illuminate the light source 230. Specifically, the modulation circuit can be used to generate a visible light signal as part of the input signal. In such a case, the light output 305 of the light source 230 can include a VLC signal.

As the light source 230 generates a light output 305, the light output 305 is directed away from the VLC device 200 in a certain pattern 304 (also called a line of sight 304 or range 304). The line of sight 304 of the light output 305 can vary depending one or more of a number of factors, including but not limited to characteristics, shape, and/or size of a lens, shape and/or size of a hood, and location of any obstacles outside the VLC device 200. Further, the light output 305 within the line of sight 304 can travel a certain distance, depending on the strength of the light source within the light source 230.

In addition, or in the alternative, a VLC device can emit other types of light that are outside of light that is visible to the human eye. For example, a VLC device can emit infrared (IR) signals using an IR source. In such a case, the receiver of an adjacent VLC device can be capable of receiving the IR signal from the IR source of the VLC device. Similarly, the controller of the adjacent VLC device can be capable of parsing the VLC signal from the IR signal. A VLC device can emit such other types of light, for example, when the light source (e.g., light source 230) is off.

The asset 398 of the VLC network 300 in this case is a work cart and is located just outside of the line of sight 304 of the light source 230 of the VLC device 200. Affixed to the top of the asset 398 is an example communication device 380 (also called an asset communication device 380), which has a line of sight 378 (also called a coverage pattern or a range). Details of an example communication device 380 are explained below with respect to FIG. 5. In certain embodiments, the line of sight 304 of the light output 305 as well as the asset 398 fall within line of sight 318 of a receiver 314 of a light source 310.

Specifically, the receiver 314 of the VLC device 310 (in this case, a lighting device) can detect the light output 305 of the VLC device 200 and the communication device 380 of the asset 398. Even more specifically, the receiver 314 can detect and, in some cases, interpret, the VLC signal in the light output 305. In addition, or in the alternative, the receiver 314 can detect and, in some cases, interpret a VLC signal emitted from the communication device 380 of the asset 398. In either case, the receiver 314 of the VLC device 310 triggers the power supply 315 (assuming the power supply 315 is not already delivering a power signal to the light source 313). The intersection of the line of sight 304 of the light source 230 and the location of the communication device 380 of the asset 398 with the line of sight 318 of the receiver 314 of the VLC device 310 is shown in FIG. 3 as area 306.

When the communication device 380 of the asset 398 communicates with the VLC device 310, the VLC signals can be used with one or more of a number of other technologies for communication. As one example, the VLC signals can be visible light in both directions (uplink from the communication device 380 to a VLC device and down link from a VLC device to the communication device 380) without the use of other communication technologies. As another example, the VLC signals can be transmitted using a VLC down link and an infrared uplink. As yet another example, the VLC signals can be transmitted using a VLC down link with a wireless uplink.

In addition, the receiver 314 can send the VLC signal to the modulation circuit 317 of the VLC device 310. In such a case, the modulation circuit 317 can generate, based on the VLC signal, a visible light signal that, along with the power signal generated by the power supply 315, is received by the light source 313 as an input signal. In certain example embodiments, the VLC device 310 includes a controller 316 that controls the receiver 314, the power supply 315, and/or the modulation circuit 317. While the controller 316, the receiver 314, the power supply 315, and the modulation circuit 317 are shown in FIG. 3 to be located inside the housing 312 of the VLC device 310, one or more of these components can be located outside the housing 312 and remain operatively coupled to each of the other components of the VLC device 310.

When the light source 313 receives the input signal from the power supply 315 and the modulation circuit 317, the light source 313 illuminates and distributes a light output 319, which includes the VLC signal, in a manner similar to that described above with respect to the light output 305 of the light source 230. Here, the light output 319 of the light source 313 is directed away from the VLC device 310 in a pattern 318 toward the ground 302.

While the VLC device 310 is shown in FIG. 3 as being mounted on a ceiling 303, the VLC device 310 can be mounted on any other surface and/or device, and the light source 313 can be directed in any direction, as long as the pattern 318 of the light source 313 is within the line of sight of the receiver 334 of the VLC device 330 (in this case, another lighting device). The intersection 325 (also called an overlap 325) of the pattern 318 of the light source 313 and the line of sight 338 of the receiver 334 of the VLC device 330 is a volume of space, as shown in FIG. 3. The line of sight 304 of the light output 305 of the VLC device 200 also falls within the intersection 325. For example, for a VLC signal being sent in the opposite direction, the pattern 318 of the light source 313 can be within the line of sight of the receiver (not shown) of the VLC device 200. When the line of sight of two VLC devices overlap, the VLC devices can be described as being adjacent to each other.

While the line of sight 318 of the receiver 314, the line of sight 338 of the receiver 334, and the pattern 318 of the light source 313 of the VLC device 310 are shown in FIG. 3 to fall within the intersection 325, the line of sight of the receiver 314 can be wider than or narrower than the pattern of the light source 313. Further, the area to which the receiver 314 directs its line of sight and to which the light source 313 directs its pattern can completely overlap, partially overlap, or have no overlap. In some cases, a VLC device 310 can be within sight of more than one other VLC devices, which enables a broader line of sight and may assist in triangulating the location of an asset.

As shown in FIG. 3, the VLC device 330 is substantially similar to the VLC device 310 described above. Specifically, the VLC device 330 includes the receiver 334, a power supply 335, a modulation circuit 337, and an optional controller 336, all of which can be located inside a housing 332 of the VLC device 330. Also, a light source 333 is disposed on an outer surface of the housing 332. The VLC device 330 and its components can behave similarly to the corresponding components of the VLC device 310.

Specifically, the receiver 334 can receive and send the VLC signal to the modulation circuit 337 of the VLC device 330. In such a case, the modulation circuit 337 can generate, based on the VLC signal, a visible light signal that, along with the power signal generated by the power supply 335, is received by the light source 333 as an input signal. In certain example embodiments, the VLC device 330 includes a controller 336 that controls the receiver 334, the power supply 335, and/or the modulation circuit 337. While the controller 336, the receiver 334, the power supply 335, and the modulation circuit 337 are shown in FIG. 3 to be located inside the housing 332 of the VLC device 330, one or more of these components can be located outside the housing 332 and remain operatively coupled to each of the other components of the VLC device 330.

When the light source 333 receives the input signal from the power supply 335 and the modulation circuit 337, the light source 333 illuminates and distributes a light output 339, which includes the VLC signal, in a manner similar to that described above with respect to the light output 319 of the light source 313. Here, the light output 339 of the light source 333 is directed away from the VLC device 330 in a pattern 338 toward the ground 302.

As with VLC device 310, while the VLC device 330 is shown in FIG. 3 as being mounted on the ceiling 303, the VLC device 330 can be mounted on any other surface and/or device, and the light source 313 can be directed in any direction (e.g., laterally, above, below), as long as the pattern 338 of the light source 333 is within the line of sight of the receiver 354 of the VLC device 350 (also sometimes called a base device 350 for being the end point of the VLC signals among the VLC devices in the VLC network 300). Likewise, for a VLC signal being sent in the opposite direction, the pattern 338 of the light source 333 can be within the line of sight of the receiver 314 of the VLC device 310.

One or more other VLC device (e.g., lighting devices) can be included in this series. In such a case, each VLC device can include a receiver, a modulation circuit, a power supply, and a light source. Further, each VLC device would be within a line of sight of at least one other VLC device in the VLC network 300. Here, the end of the VLC communication is with the base device 350. The base device 350 is a type of VLC device.

Alternatively, a VLC device can be outside the "line of sight" of other VLC devices in the VLC network 300 and still be able to communicate with one or more of those other VLC devices using VLC signals. For example, as shown in FIG. 3, VLC device 378 is mounted on an I-beam 379. VLC device 378 in this case is substantially similar to VLC device 200, except as described below. VLC device 378 includes a light source 373 that emits a light output 374. Since the light output 374 emitted by the light source 373 is weak, the line of sight 375 defined by the light output 374 is small.

In this case, the line of sight 375 does not overlap with a line of sight for any other VLC device in the VLC network 300. For example, the line of sight 318 for the light source 313 of VLC device 310 is close to overlapping with the line of sight 375 for VLC device 378, but does not in fact do so. Instead, VLC device 378 can use any of a number of other communication methods to communicate with one or more VLC devices in the VLC network 300.

For example, VLC device 378 can use a fiber optic cable 371 to bridge the gap and overlap with the line of sight 318 for the light source 313 of VLC device 310. Specifically, the distal end 372 of the fiber optic cable 371 is exposed within the line of sight 318 for the light source 313 of VLC device 310, which essentially extends the line of sight 375 of the VLC device 378 to include the distal end 372 of the fiber optic cable 371. As another example, VLC device 378 can send and receive radio frequency (RF) signals using WiFi to communicate with one or more VLC devices in the VLC network 300.

In certain example embodiments, the VLC network 300 includes a base device 350. The base device 350 can represent an end point (beginning, end) in a daisy-chain of VLC devices that transfer a VLC signal. The base device 350 can include a receiver 354, which has a line of sight 358 and can receive the VLC signal. The line of sight 358 of the receiver 354 and the pattern 338 of the light output 339 of the VLC device 330 have an overlap 345, as shown in FIG. 3. The line of sight 358 of the receiver 354 and the pattern 318 of the light source 313 of the VLC device 310 also have an overlap 395. Most of the line of sight 304 of the light output 305 of the VLC device 200 also falls within the overlap 395.

When the receiver 354 receives the VLC signal, and when the base device 350 represents the end of the daisy-chain of VLC devices that transfer the VLC signal, the VLC signal is sent to a translation module 360 of the base device 350. The base device 350 is a type of VLC device. In certain example embodiments, the translation module 360 translates the VLC signal received from a VLC device (e.g., from the light source 333 of VLC device 330) into a communication format.

Once in the translation module 360 translates the VLC signal into the communication format, a communication module 361 of the base device 350 can send the VLC signal in the communication format. The communication module 361 of the base device 350 can be communicably coupled to one or more network managers 370 (e.g., server, computer, control panel, alarm panel, cell phone, loudspeaker, siren) using wired and/or wireless technology. For example, as shown in FIG. 3, the communication module 361 is communicably coupled to an information source that is a control panel positioned in a control room 372 using a cable 365. The network manager 370 can be considered a VLC device.

In this case, the control room 372 is outside the volume of space 399, although the control room 372 can also be located in the same or a different volume of space. Alternatively, the network manager 370 (or other communication device) can be a stand-alone device not inside of a room. Each network manager 370 can send VLC signals in the communication format to and/or receive VLC signals in the communication format from one or more base device (e.g., base device 350). The network manager 370 can communicate (send to, receive from) a VLC signal to a user in a user format. Thus, the network manager 370 can translate a VLC signal between a user format and a communication format. In certain example embodiments, the communication format is the same as the user format or the format used between VLC devices.

In certain example embodiments, the network manager 370 includes one or more of the functions of the base device 350. For example, the network manager 370 can include a translation module, such as the translation module 360 discussed above. As another example, the network manager 370 can include a communication module, such as the communication module 361 discussed above. The example base device 350 can also include a light source 353, a controller 356, and a power supply 355. In such a case, the base device 350 can initiate and/or relay a VLC signal using a light output of the light source 353. In certain example embodiments, the communication module 361 uses wired technology (e.g., cable 365), rather than wireless technology, to communicate a VLC signal in the communication format to a network manager 370. As a result, one or more of the communication problems (e.g., excessive vibration, excessive noise) commonly at issue from using wireless technology in some volumes of space 399 can be avoided and/or minimized.

In certain example embodiments, the base device 350 (and/or any other VLC device in the VLC network 300) can interpret a VLC signal and create its own separate VLC signal for one or more other light sources, assets, and/or other VLC devices. For example, if a VLC signal received by the base device 350 reports a fire in the volume of space 399, the translation module 360 (or some other component) of the base device 350 can determine that a new VLC signal should be initiated to notify any human assets in or proximate to the volume of space 399 of the emergency condition and to leave the area.

As explained above, for an asset 398 to be located using example embodiments, the asset 398 must be located within the line of sight of at least one VLC device. When an asset 398 is located within the line of sight (range) of only one VLC device (e.g., VLC device 318), the precise location of the asset 398 can be difficult to ascertain. When an asset 398 is located within a line of sight (range) of multiple VLC devices (e.g., VLC device 330, VLC device 350), it becomes easier to establish a precise location of the asset 398 in the volume of space 399. Specifically, the greater the number of VLC devices that can communicate directly with the communication device 380 of the asset 398, the more precisely the location of the asset 398 can be determined.

As explained below with respect to FIGS. 5 and 6, a communication device and/or an asset tracking manager 602 can use one or more protocols and/or one or more algorithms to determine the location of an asset 398 with as much precision as possible, based in part on the number of VLC devices that communicate directly with the asset 398. Such algorithms can represent any of a number of methods currently known in the field of establishing a location. For example, the angle of arrival (AoA) and/or the Angle of Departure (AoD) of each communication signal transmitted between a VLC device and the asset 398 can be measured to help determine the location of the asset 398 within the volume of space 399. As another example, measuring the time of flight (ToF) of communication signals transmitted between a VLC device and the asset 398 can help determine the location of the asset 398 within the volume of space 399.

Figure 4:
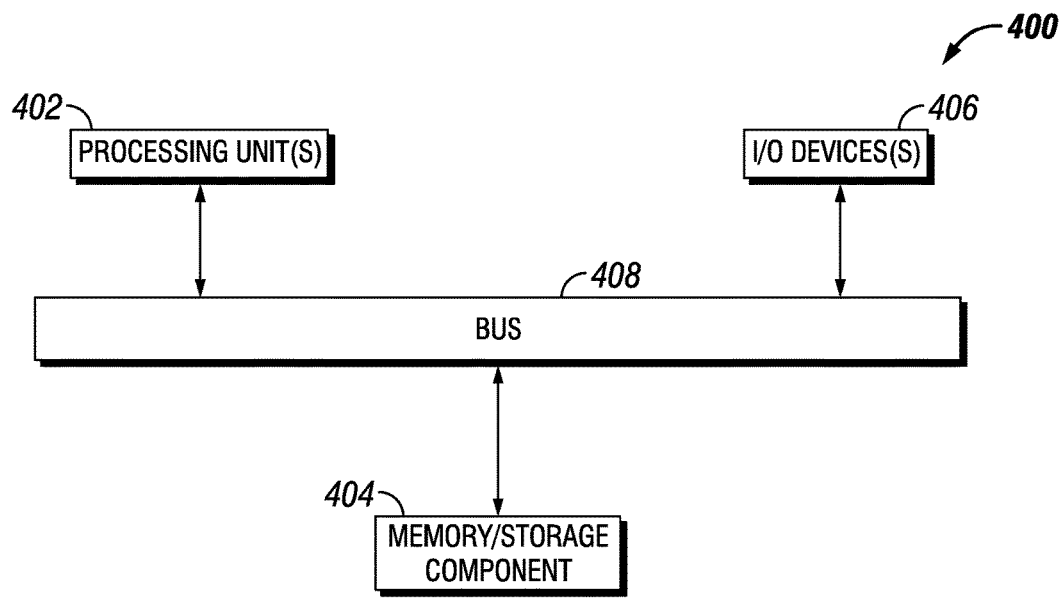
FIG. 4 shows a computer system used for communicating a condition in a volume of space using a VLC network in accordance with certain example embodiments.

FIG. 4 illustrates one embodiment of a computing device 400 capable of implementing one or more of the various techniques described herein, and which may be representative, in whole or in part, of the elements described herein. Computing device 400 is only one example of a computing device and is not intended to suggest any limitation as to scope of use or functionality of the computing device and/or its possible architectures. Neither should computing device 400 be interpreted as having any dependency or requirement relating to any one or combination of components illustrated in the example computing device 400. As shown in FIG. 4, the bus 408 is operatively coupled to each of the processing unit(s) 402, the I/O device(s) 406, and the memory/storage component 404.

Computing device 400 includes one or more processors or processing units 402, one or more memory/storage components 404, one or more input/output (I/O) devices 406, and a bus 408 that allows the various components and devices to communicate with one another. Bus 408 represents one or more of any of several types of bus structures, including a memory bus or memory controller, a peripheral bus, an accelerated graphics port, and a processor or local bus using any of a variety of bus architectures. Bus 408 can include wired and/or wireless buses.

Memory/storage component 404 represents one or more computer storage media. Memory/storage component 404 may include volatile media (such as random access memory (RAM)) and/or nonvolatile media (such as read only memory (ROM), flash memory, optical disks, magnetic disks, and so forth). Memory/storage component 404 can include fixed media (e.g., RAM, ROM, a fixed hard drive, etc.) as well as removable media (e.g., a Flash memory drive, a removable hard drive, an optical disk, and so forth).

One or more I/O devices 406 allow a customer, utility, or other user to enter commands and information to computing device 400, and also allow information to be presented to the customer, utility, or other user and/or other components or devices. Examples of input devices include, but are not limited to, a keyboard, a cursor control device (e.g., a mouse), a microphone, and a scanner. Examples of output devices include, but are not limited to, a display device (e.g., a monitor or projector), speakers, a printer, and a network card.

Various techniques may be described herein in the general context of software or program modules. Generally, software includes routines, programs, objects, components, data structures, and so forth that perform particular tasks or implement particular abstract data types. An implementation of these modules and techniques may be stored on or transmitted across some form of computer readable media. Computer readable media may be any available non-transitory medium or non-transitory media that can be accessed by a computing device. By way of example, and not limitation, computer readable media may comprise "computer storage media".

"Computer storage media" and "computer readable medium" include volatile and non-volatile, removable and non-removable media implemented in any method or technology for storage of information such as computer readable instructions, data structures, program modules, or other data. Computer storage media include, but are not limited to, computer recordable media such as RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by a computer.

The computer device 400 may be connected to a network (not shown) (e.g., a local area network (LAN), a wide area network (WAN) such as the Internet, or any other similar type of network) via a network interface connection (not shown). Those skilled in the art will appreciate that many different types of computer systems exist (e.g., desktop computer, a laptop computer, a personal media device, a mobile device, such as a cell phone or personal digital assistant, or any other computing system capable of executing computer readable instructions), and the aforementioned input and output means may take other forms, now known or later developed. Generally speaking, the computer system 400 includes at least the minimal processing, input, and/or output means necessary to practice one or more embodiments.

Further, those skilled in the art will appreciate that one or more elements of the aforementioned computer device 400 may be located at a remote location and connected to the other elements over a network. Further, one or more example embodiments may be implemented on a distributed system having a plurality of nodes, where each portion of the implementation (e.g., controller, modulation circuit, base device, enclosure) may be located on a different node within the distributed system. In one or more embodiments, the node corresponds to a computer system. Alternatively, the node may correspond to a processor with associated physical memory. The node may alternatively correspond to a processor with shared memory and/or resources.

Figure 5:
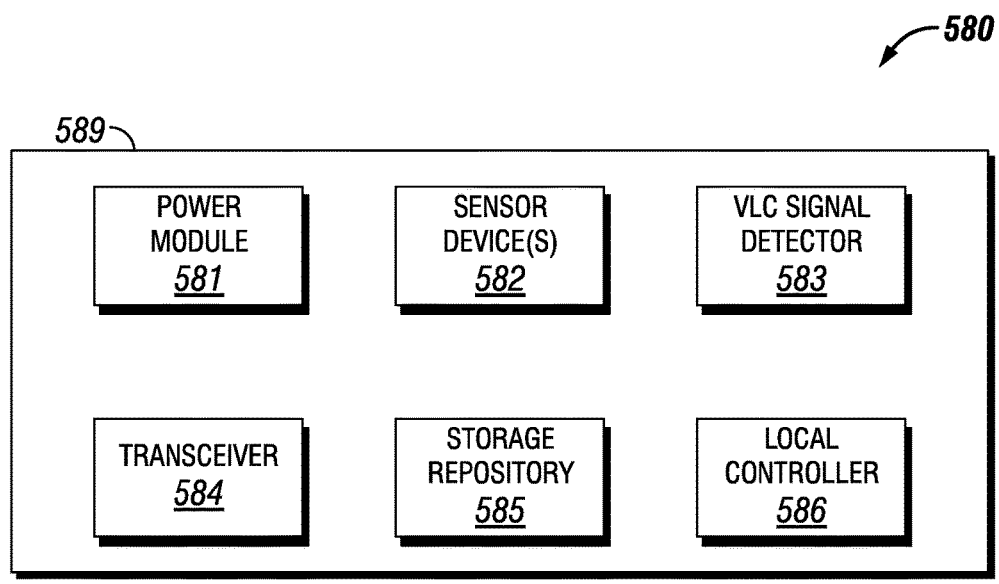
FIG. 5 shows a system diagram of a communication device in accordance with certain example embodiments.

FIG. 5 shows a system diagram of a communication device 580 in accordance with certain example embodiments. A communication device 580 can both send and receive signals. Alternatively, a communication device 580 can only send signals or only receive signals. In such a case, the communication device 580 can be referred to as an emitter 580 or a receiver 580, respectively. Referring to FIGS. 1-5, the communication device 580 can include a number of components. For example, as shown in FIG. 5, the communication device 580 can include a power module 581, one or more sensor devices 582, a VLC signal detector 583, a transceiver 584, a storage repository, and a local controller 586. The communication device 580 can include a housing 589 that can be disposed within, on, or remotely from the asset 398. The communication device 580 can be (or be part of) a device that is disposed on an outer surface of an asset 398. For example, the communication device 580 can be, or be embedded in, a name tag, hard hat, head lamp, or badge worn by a person (a type of asset 398).

The power module 581 of the communication device 580 provides power to one or more other components (e.g., VLC signal detector 583, local controller 586) of the communication device 580. The power module 581 can include one or more of a number of single or multiple discrete components (e.g., transistor, diode, resistor, integrated circuit), and/or a microprocessor. The power module 581 may include a printed circuit board, upon which the microprocessor and/or one or more discrete components are positioned. In some cases, the power module 581 can include one or more components that allow the power module 581 to measure one or more elements of power (e.g., voltage, current) that is delivered to and/or sent from the power module 581, The power module 581 can include one or more components (e.g., a transformer, a diode bridge, an inverter, a converter) that receives power from a source (e.g., a battery, a supercapacitor) and generates power of a type (e.g., AC, DC) and level (e.g., 50 mV, 1V, 12V, 24V, 220V) that can be used by the other components of the communication device 580. In addition, or in the alternative, the power module 581 can be a source of power in itself to provide signals to the other components of the communication device 580. For example, the power module 581 can include a localized photovoltaic power system with one or more solar panels disposed on the housing 589 of the communication device 580.

The transceiver 584 of the communication device 580 can send and/or receive control and/or communication signals. Specifically, the transceiver 584 can be used to transfer data between the communication device 580 and a user and/or a VLC device (e.g., VLC device 310). The transceiver 584 can use wired and/or wireless technology. The transceiver 584 can be configured in such a way that the control and/or communication signals sent and/or received by the transceiver 584 can be received and/or sent by another receiver (e.g., transceiver 240) that is part of a user and/or a VLC device (e.g., VLC device 200). The transceiver 584 can use any of a number of signal types, including but not limited to radio signals.

When the transceiver 584 of the communication device 580 uses wireless technology, any type of wireless technology can be used by the transceiver 584 in sending and receiving signals. Such wireless technology can include, but is not limited to, radio frequency (RF), visible light communication, and cellular networking. The transceiver 584 can use one or more of any number of suitable communication protocols (e.g., ISA100, HART, WiFi, Bluetooth) when sending and/or receiving signals. Such communication protocols can be stored in the storage repository 585. Further, any transceiver information for a user and/or the electrical equipment can be part of the data stored in the storage repository 585.

The storage repository 585 can be a persistent storage device (or set of devices) that stores software and data used to assist the communication device 580 in communicating with a user and/or a VLC device. In one or more example embodiments, the storage repository 585 stores data, including but not limited to one or more communication protocols, measurements of the sensor devices 582, and signals received by the VLC signal detector 583.

Examples of a storage repository 585 can include, but are not limited to, a database (or a number of databases), a file system, a hard drive, flash memory, some other form of solid state data storage, or any suitable combination thereof. The storage repository 585 can be located on multiple physical machines, each storing all or a portion of data according to some example embodiments. Each storage unit or device can be physically located in the same or in a different geographic location.

The storage repository 585 can be operatively connected to the local controller 586. In one or more example embodiments, the local controller 586 includes functionality, using the transceiver 584, to communicate with a user and/or a VLC device. More specifically, the local controller 586 sends information to and/or receives information from the storage repository 585 in order to communicate with a user and the VLC devices. As discussed below, the storage repository 585 can also be operatively connected to the local controller 586 in certain example embodiments.

The one or more sensor devices 582 (also called sensor modules or sensors) can be any type of sensing device that measure one or more parameters. Examples of types of sensor devices 582 can include, but are not limited to, a gyroscope, an accelerometer, a respiratory monitor, and a resistance temperature detector. A parameter that can be measured by a sensor device 582 can include, but is not limited to, motion, a location, an orientation, velocity, acceleration, an amount of ambient light, and a temperature. Each sensor device 582 can use one or more of a number of communication protocols.

A sensor device 582 can be disposed within, on, or remotely from the communication device 580. A parameter measured by a sensor device 582 can be associated with an asset. In certain example embodiments, a sensor device 582 can include a battery that is used to provide power, at least in part, to some or all of the rest of the sensor device 582. Alternatively, a sensor device 582 can receive power from the power module 581.

The VLC signal detector 583 of the communication device 580 can be used to detect a VLC signal or other communication signal (e.g., a RF signal) sent from a VLC device. The VLC signal detector 593 can use one or more of a number of technologies. For example, the VLC signal detector 593 can use optical technology to detect a VLC signal within a specific range of acceptance angles. As another example, the VLC signal detector 593 can include an angular correction filter so that it can detect a VLC signal, regardless of the angle at which the VLC signal reaches the VLC signal detector 593. As yet another example, the VLC signal detector 593 can include an ambient light filter so that the VLC signal detector 593 detects the VLC signal (e.g., modulated light pattern) from among one or more other sources of light. As still another example, the VLC signal detector 593 can include another filter that only allows the VLC signal detector 593 to detect certain characteristics of light (e.g., a range of wavelengths) that are part of the VLC signal. In some cases, the VLC signal detector 583 can be considered a sensor device 582.

The local controller 586 of the communication device 580 can coordinate and control the other components (e.g., power module 581, sensor device 582) of the communication device 580. For example, the local controller 586 can interpret a VLC signal received by the VLC signal detector 583. As another example, the local controller 586 can collect and interpret 3-axis motion information measured by one or more of the sensor devices 582. As yet another example, the local controller 586 can manage the power generated by the power module 581 and distributed to any or all of the other components of the communication device 580. As still another example, the local controller 586 (also called a signal generator) can generate and send, using the transceiver 584, a unique identification code through the VLC network so that the asset 398 associated with the transceiver 584 can be identified, located, and tracked.

As explained above with respect to FIG. 3, the local controller 586 of the communication device 580 can use one or more protocols and/or one or more algorithms (stored in the storage repository 585) to determine the location of an asset (e.g., asset 398) with as much precision as possible, based in part on the number of VLC devices that communicate directly with the asset. Such algorithms can represent any of a number of methods currently known in the field of establishing a location. For example, the angle of arrival (AoA) and/or the Angle of Departure (AoD) of each communication signal transmitted between one or more VLC devices and the asset can be measured to help determine the location of the asset. As another example, measuring the time of flight (ToF) of communication signals transmitted between one or more VLC devices and the asset can help determine the location of the asset.

In certain example embodiments, the local controller 586 can include one or more hardware processors, examples of which are described below with respect to FIG. 6. Alternatively, the local controller 586 does not include a hardware processor. In such a case, the local controller 586 can include, as an example, one or more field programmable gate arrays (FPGA), one or more insulated-gate bipolar transistors (IGBTs), and/or one or more integrated circuits (ICs). Using FPGAs, IGBTs, ICs, and/or other similar devices known in the art allows the local controller 586 (or portions thereof) to be programmable and function according to certain logic rules and thresholds without the use of a hardware processor. Alternatively, FPGAs, IGBTs, ICs, and/or similar devices can be used in conjunction with one or more hardware processors.

Figure 6:
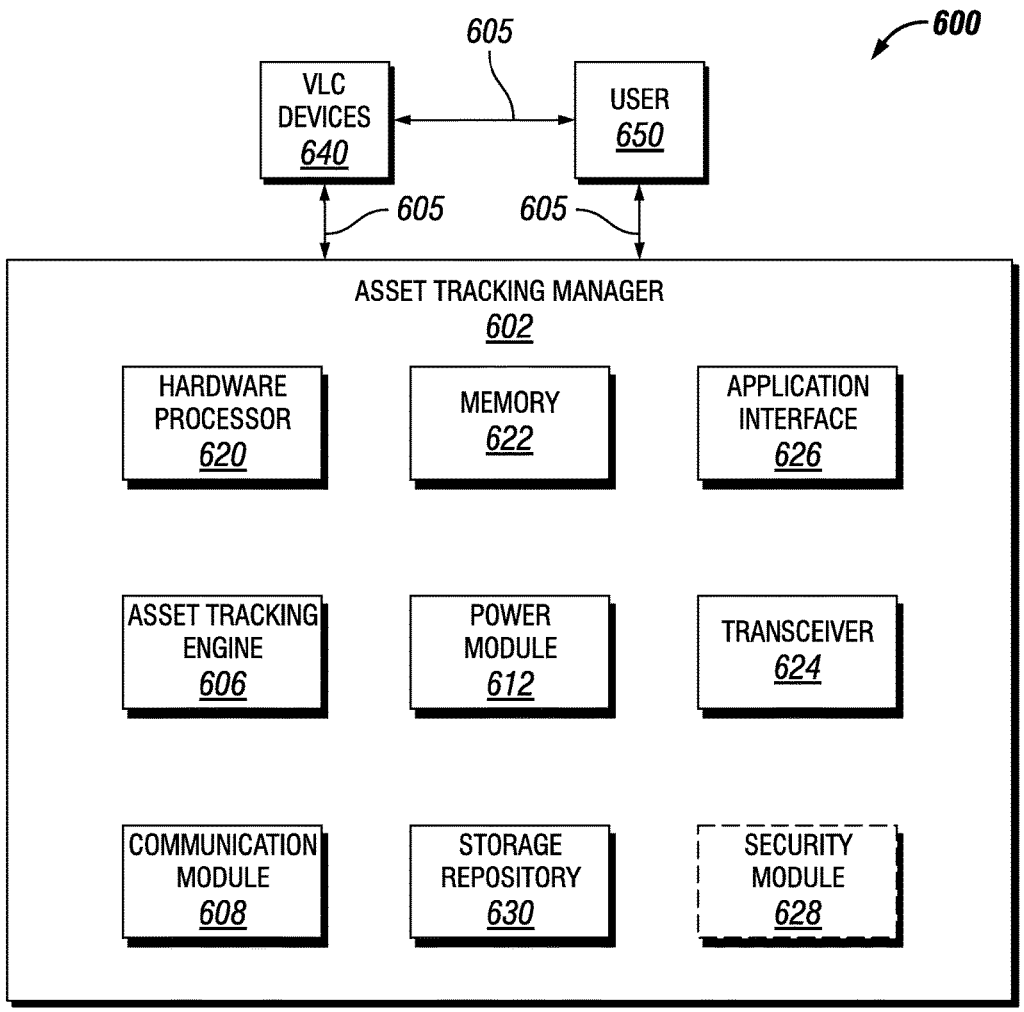
FIG. 6 shows a system diagram of an asset tracking system that includes an asset tracking manager in accordance with certain example embodiments.

FIG. 6 shows a system diagram of an asset tracking system 600 that includes an asset tracking manager 602 in accordance with certain example embodiments. In addition to the asset tracking manager 602, the asset tracking system 600 in this example includes one or more VLC devices 640 and a user 650. In some cases, the asset tracking manager 602 is a stand-alone device. Alternatively, the asset tracking manager 602, or portions and/or capabilities thereof, can be part of a VLC device (e.g., VLC device 350). Alternatively, one or more components and/or capabilities of the asset tracking manager 602 can be shared with a VLC device.

The asset tracking manager 602 can include one or more of a number of components. For example, in this case, the asset tracking manager 602 includes an asset tracking engine 606, a communication module 608, a power module 612, a hardware processor 620, memory 622, a transceiver 624, an application interface 626, a storage repository 630, and an optional security module 628. The asset tracking manager 602 can also include one or more of a number of other components, including but not limited to a timer.

Referring to FIGS. 1-6, the user 650, the VLC devices 640, and the asset tracking manager 602 are coupled (e.g., electrically, communicably) to each other using communication links 605. Each communication link 605 can include wired (e.g., Class 1 electrical cables, Class 2 electrical cables, electrical connectors) and/or wireless (e.g., Wi-Fi, VLC, cellular networking, Bluetooth, WirelessHART, ISA100, Power Line Carrier, RS485) technology. The communication link 605 can transmit any of a number of different signals (e.g., VLC signals, power signals, other communication signals, control signals, data).

In certain example embodiments, the asset tracking module 606 of the asset tracking manager 602 includes analytical and mapping tools (e.g., using algorithms and/or protocols stored in the storage repository 630) that allow a VLC signal or other communication signal sent by a communication device 580 to be received and analyzed so that the asset 398 associated with the communication device 580 can be identified and located. The asset tracking module 606 also controls the other components of the asset tracking manager 602 to perform its functions.

As explained above with respect to FIG. 3, an asset tracking engine 606 of the asset tracking manager 602 can use one or more protocols and/or one or more algorithms (stored in the storage repository 630) to determine the location of an asset (e.g., asset 398) with as much precision as possible, based in part on the number of VLC devices that communicate directly with the asset. Such algorithms can represent any of a number of methods currently known in the field of establishing a location. For example, the angle of arrival (AoA) and/or the Angle of Departure (AoD) of each communication signal transmitted between one or more VLC devices and the asset can be measured to help determine the location of the asset. As another example, measuring the time of flight (ToF) of communication signals transmitted between one or more VLC devices and the asset can help determine the location of the asset.

The communication module 608 of the asset tracking manager 602 determines and implements the communication protocol (e.g., from communication protocols stored in the storage repository 630) that is used when the asset tracking engine 606 communicates with (e.g., sends VLC or other communication signals to, receives VLC or other communication signals from) the user 650 and/or one or more of the VLC devices 640.

The communication module 608 can send and receive data between the user 650 and/or one or more of the VLC devices 640. The communication module 608 can send and/or receive data in a given format that follows a particular communication protocol. The asset tracking engine 606 can interpret the data packet received from the communication module 608 using the communication protocol information stored in the storage repository 630. The asset tracking engine 606 can also facilitate the data transfer between the user 650 and/or one or more of the VLC devices 640 by converting the data into a format understood by the communication module 608.

The communication module 608 can send data directly to and/or retrieve data directly from the storage repository 130. Alternatively, the asset tracking engine 606 can facilitate the transfer of data between the communication module 608 and the storage repository 630. The communication module 608 can also provide encryption to data that is sent by the asset tracking manager 602 and decryption to data that is received by the asset tracking manager 602. The communication module 608 can also provide one or more of a number of other services with respect to data sent from and received by the asset tracking manager 602. Such services can include, but are not limited to, data packet routing information and procedures to follow in the event of data interruption.

The user 650 and/or the VLC devices 640 can interact with the asset tracking manager 602 using the application interface 626 in accordance with one or more example embodiments. Specifically, the application interface 626 of the asset tracking manager 602 receives data (e.g., VLC signals, information, communications, instructions, updates to firmware) from and sends data (e.g., VLC signals information, communications, instructions) to the user 650 and/or each VLC device 640. The user 650 and/or each VLC device 640 can include an interface to receive data from and send data to the asset tracking manager 602 in certain example embodiments. Examples of such an interface can include, but are not limited to, a modulation circuit (e.g., modulation circuit 220), a receiver (e.g., transceiver 240), a measuring device (e.g., measuring device 255), a VLC signal detector (e.g., VLC signal detector 583), a graphical user interface, a touchscreen, an application programming interface, a keyboard, a monitor, a mouse, a web service, a data protocol adapter, some other hardware and/or software, or any suitable combination thereof.

The hardware processor 620 of the asset tracking manager 602 executes software, algorithms, and firmware in accordance with one or more example embodiments. Specifically, the hardware processor 620 can execute software on the asset tracking engine 606 or any other portion of the asset tracking manager 602, as well as software used by the user 650 and/or one or more of the VLC devices 640. The hardware processor 620 can be an integrated circuit, a central processing unit, a multi-core processing chip, SoC, a multi-chip module including multiple multi-core processing chips, or other hardware processor in one or more example embodiments. The hardware processor 620 is known by other names, including but not limited to a computer processor, a microprocessor, and a multi-core processor.

In one or more example embodiments, the hardware processor 620 executes software instructions stored in memory 622. The memory 622 includes one or more cache memories, main memory, and/or any other suitable type of memory. The memory 622 can include volatile and/or non-volatile memory. The memory 622 is discretely located within the asset tracking manager 602 relative to the hardware processor 620 according to some example embodiments. In certain configurations, the memory 622 can be integrated with the hardware processor 620.

In certain example embodiments, the asset tracking manager 602 does not include a hardware processor 620. In such a case, the asset tracking manager 602 can include, as an example, one or more FPGAs, one or more IGBTs, and/or one or more ICs. Using FPGAs, IGBTs, ICs, and/or other similar devices known in the art allows the asset tracking manager 602 (or portions thereof) to be programmable and function according to certain logic rules and thresholds without the use of a hardware processor. Alternatively, FPGAs, IGBTs, ICs, and/or similar devices can be used in conjunction with one or more hardware processors 620.

Optionally, in one or more example embodiments, the security module 628 secures interactions between the asset tracking manager 602, the user 650, and/or the VLC devices 640. More specifically, the security module 628 authenticates communication from software based on security keys verifying the identity of the source of the communication. For example, user software may be associated with a security key enabling the software of the user 650 to interact with the asset tracking manager 602 and/or the VLC devices 640. Further, the security module 628 can restrict receipt of information, requests for information, and/or access to information in some example embodiments.

The power module 612 of FIG. 6 can be substantially the same as the power module 581 described above with respect to FIG. 5. Similarly, the storage repository 630 of FIG. 6 can be substantially the same as the storage repository 585 described above with respect to FIG. 5. In addition, the transceiver 624 of FIG. 6 can be substantially the same as the transceiver 584 described above with respect to FIG. 5.

Figure 7:
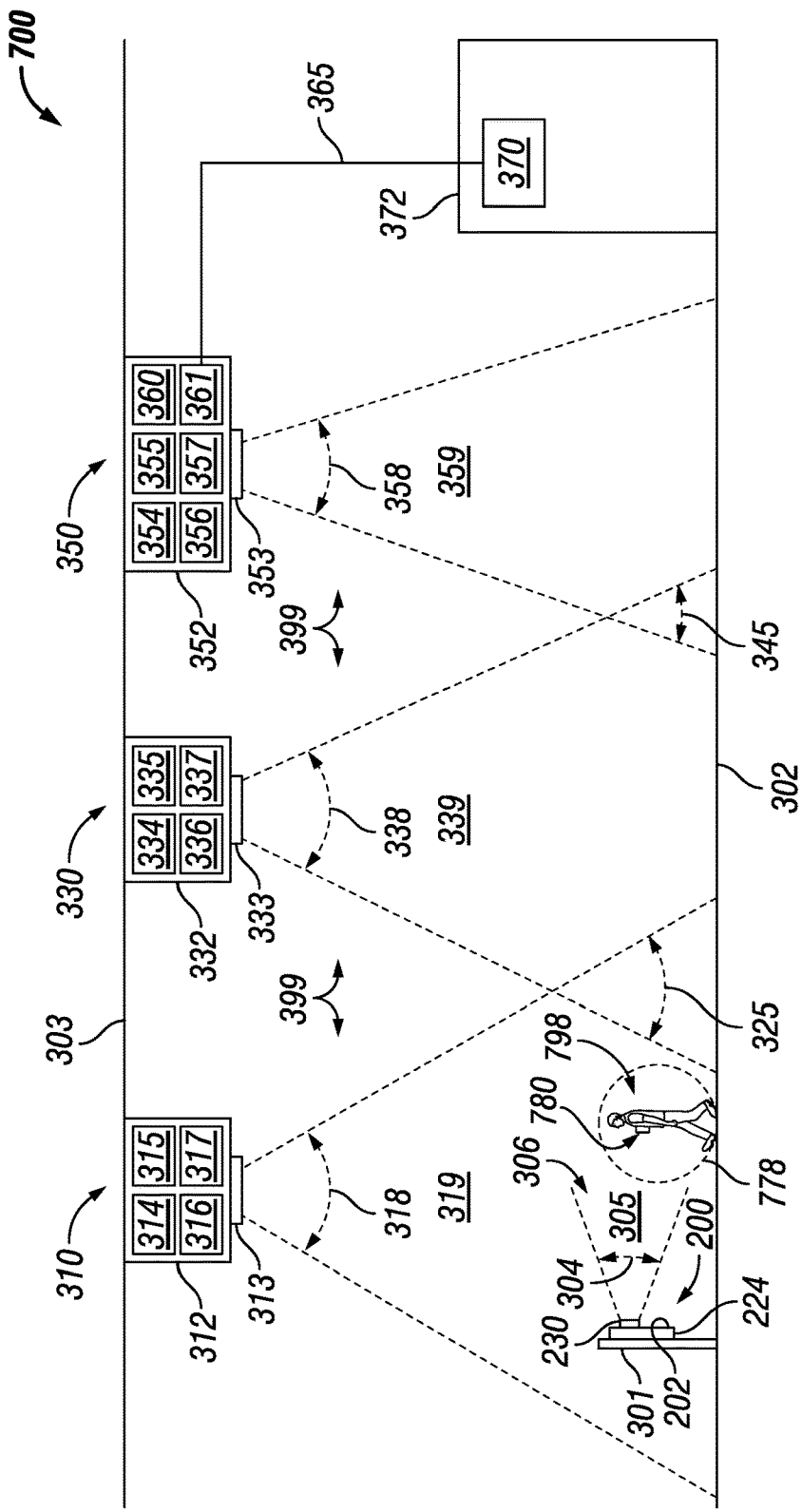
FIGS. 7 and 8 show an example of tracking an asset in a volume of space using example embodiments.
Figure 8:
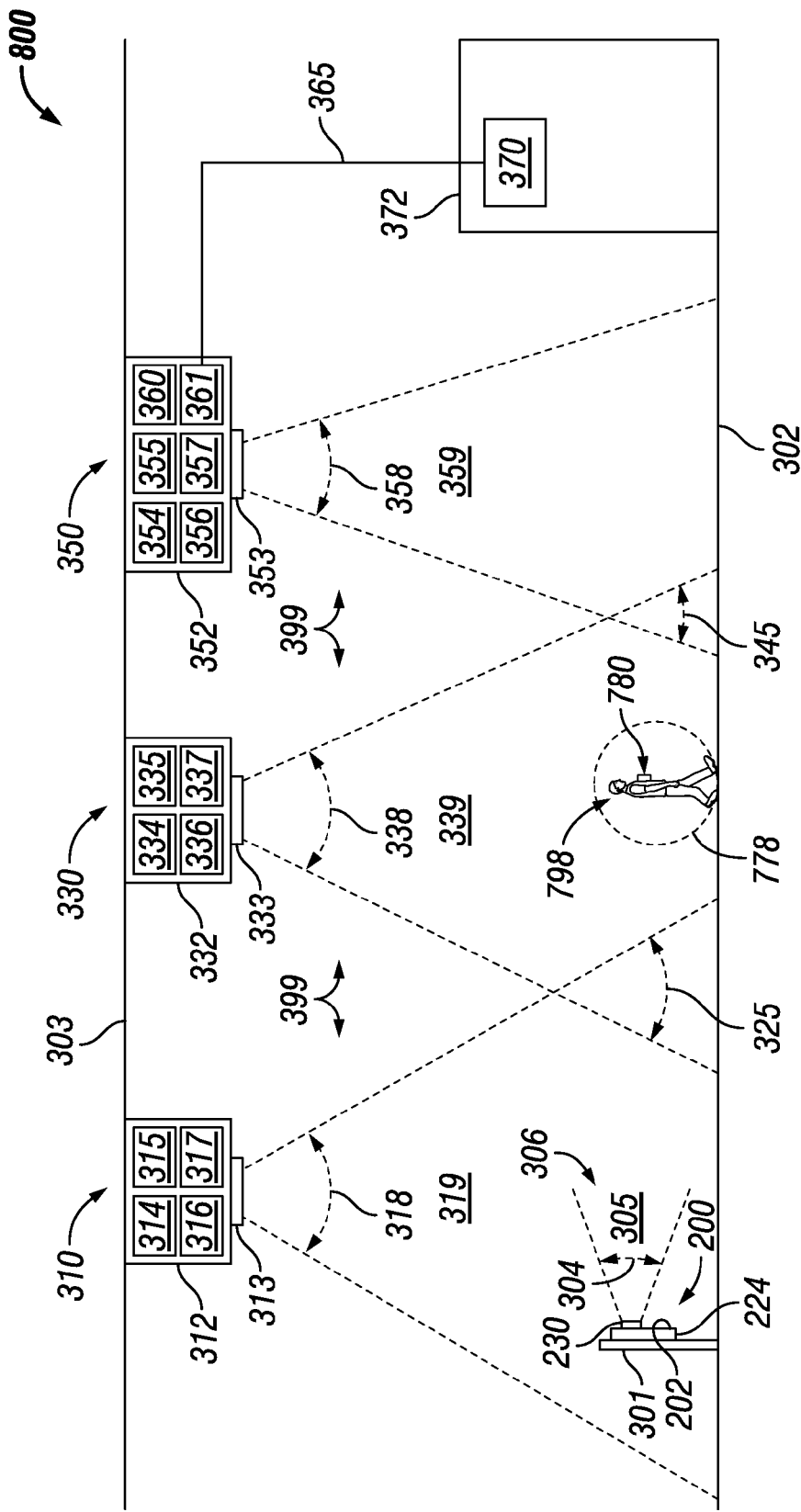

FIGS. 7 and 8 show an example of tracking an asset in a volume of space 399 using example embodiments. Referring to FIGS. 1-8, the VLC network 700 of FIG. 7 is substantially the same as the VLC network 300 of FIG. 3, except that in this case the asset 798 is a person (e.g., an employee, a contractor, a visitor), and the communication device 780 is part of a badge worn by the asset 798. Further, the line of sight 318 (range) of the VLC device 310, the line of sight 338 (range) of the VLC device 313, and the line of sight 358 (range) of the VLC device 350 shown in FIGS. 7 and 8 are less than what was shown and described above with respect to FIG. 3.

As a result, the intersection 325 (also called an overlap 325) of the pattern 318 of the light source 313 and the line of sight 338 of the receiver 334 of the VLC device 330, as well as the intersection 345 (also called an overlap 345) of the pattern 358 of the light source 353 and the line of sight 338 of the receiver 334 of the VLC device 330, shown in FIGS. 7 and 8 are less than what was shown and described above with respect to FIG. 3. Further, the asset 798 of FIG. 7 is in approximately the same position in the volume of space 399 as the asset 398 of FIG. 3. Also, the VLC device 370 of FIG. 3, including the fiber optic cable 371, is not included in the VLC network 700 of FIG. 7.

The communication device 780 associated with the asset 798 can communicate in one or more of a number of ways. For example, the communication device 780 can transmit a VLC signal that includes data that identifies the asset 798 and any data associated with the measurements of the sensor devices 582 (e.g., gyroscope, accelerometer). In FIG. 7, the line of sight 778 (coverage pattern 778) of the asset 798 is within the line of sight 318 of the VLC device 310. When the communication device 780 sends the VLC signal, the VLC device 310 receives the VLC signal. Upon receiving the VLC signal from the communication device 780, VLC device 310 forwards it to VLC device 330, which forwards it to VLC device 350, which forwards it to the network manager 370 in the manner described above with respect to FIG. 3. In some cases, upon receiving the VLC signal from the communication device 780, VLC device 310 generates and sends a responding VLC signal to the communication device 780 confirming receipt of the VLC signal from the communication device 780.

In certain example embodiments, the network manager 370 knows the coverage pattern 778 of the communication device 780. In addition, the network manager 370 knows the arrangement and lines of sight of each VLC device in the VLC network 700. If the communication device 780 does not initiate the communication process, or if the VLC signal sent by the communication device 780 to VLC device 310 does not include some of the identifying information (e.g., data associated with the measurements of the sensor devices 582 (e.g., gyroscope, accelerometer)), then the network manager 370 can identify the origin of the VLC signal sent by the communication device 780 (and so also the location of the asset 798 in the volume of space 399) using this knowledge of the coverage pattern 778 of the communication device 780 and the arrangement and lines of sight of each VLC device in the VLC network 700.

When the VLC signal sent by the communication device 780 of the asset 798 includes data associated with the measurements of the sensor devices 582 (e.g., gyroscope, accelerometer), then the network manager 370 can use this information to predict the path that the asset 798 will travel in the volume of space 399. This prediction can be compared to the next transmission (VLC signal) initiated by the communication device 780, and the forecasted path of the asset 798 can subsequently be revised using additional communications from the communication device 780 of the asset 798.

In certain example embodiments, the communication device 780 of the asset 798 initiates communication in the VLC network 700. For example, if one or more of the sensor devices 582 of the communication device 780 detects some minimal amount of motion of the asset 798, then the communication device 780 can send an initial VLC signal. In some cases, the communication device 780 will continue to send the VLC signal until it receives a responsive VLC signal from another VLC device (e.g., VLC device 310) in the VLC network 700, where the responsive VLC signal acknowledges receipt of the initial VLC signal sent by the communication device 780. In this way, the energy used by the power module 581 of the communication device 780 can be conserved by only transmitting a VLC signal when movement of the asset 798 is detected by the sensor devices 582 of the communication device 780.

As an alternative, a communication device 780 can estimate the location (e.g., using x, y, and z coordinates) of the asset 798 within the volume of space 399. For example, when a communication device 780 is within a line of sight of one or more VLC devices (e.g., VLC device 310), the VLC device can send a VLC signal to the communication device 780. Such a VLC signal can include the location information of that VLC device sending the VLC signal. The location information can be provided to the VLC device by the network manager 370.

The VLC signal detector 583 of the communication device 780 can receive the VLC signals sent by the VLC devices, and the local controller 586 of the communication device 780 can interpret the VLC signals, thereby determining the location of the VLC devices that have communicated with the communication device 780. In some cases, the local controller 586 of the communication device 780 can determine the intensity of the VLC signals sent by the VLC devices. Further, the local controller 586 can interpret measurements taken by the sensor devices 582 of the communication device 780. Using some or all of this information, the local controller 586 of the communication device 780 can determine the location of the asset 798 within the hazardous environment 399. In some cases, the local controller 586 of the communication device 780 can also project a path of travel for the asset 798 using some or all of this information. This information can be part of a VLC signal sent by the communication device 780.

Knowing the location of an asset 798, the network manager 370 can inform a user (e.g., the asset 798, workers) information relevant to the asset 798 and its location and/or projected path of travel. Such information can include, but is not limited to, the location of a chemical spill, a path of emergency egress for the asset 798, an "off limits" space within the volume of space 399, inventory management, mechanical failure of an asset 798, failure of an asset 798 to remain outside of a restricted space, failure of a communication device (e.g., communication device 780) to transmit effectively, and a headcount.

FIG. 8 shows a VLC network 800 that is substantially the same as the VLC network 700 of FIG. 7, except that the asset 798 has moved out of the line of sight 318 of VLC device 310 and into the line of sight 338 of VLC device 330. As a result, the network manager 370 can track and forecast the movement of the asset 798 using the VLC signals initiated by the communication device 780 of the asset 798 as the asset moves through the volume of space 399.

In one or more example embodiments, example embodiments of asset tracking using VLC networks can provide real-time monitoring of employees, visitors, contractors, mobile equipment, inventory, and a number of other assets in a facility. Example embodiments can be used to improve safety by identifying assets that are near or within a hazard zone at a facility. Example embodiments can also be used to monitor resource deployment in real time to optimize procedures and work flows. Further, example embodiments can use geo-fencing technologies to limit access to a particular area of a facility.

Example embodiments can be used in hazardous locations allow for more reliable communication of one or more conditions that exist in a hazardous location. VLC networks used to track assets can operate substantially independent of, and in conjunction with, many hazards that exist in a hazardous location, including but not limited to heat, cold, moisture, vibration, and chemicals. Thus, using example embodiments described herein can improve communication, safety, maintenance, costs, and operating efficiency.

Accordingly, many modifications and other embodiments set forth herein will come to mind to one skilled in the art to which tracking assets using VLC networks in volumes of space pertain having the benefit of the teachings presented in the foregoing descriptions and the associated drawings. Therefore, it is to be understood that tracking assets using VLC networks in volumes of space are not to be limited to the specific embodiments disclosed and that modifications and other embodiments are intended to be included within the scope of this application. Although specific terms are employed herein, they are used in a generic and descriptive sense only and not for purposes of limitation.

What is claimed is:

1. A system for locating an asset, comprising:
a first visible light communication (VLC) device comprising a first controller, a first transceiver, and a first light source, wherein the first transceiver has a first range, wherein the first controller broadcasts, using the first transceiver, a first communication signal, wherein the first communication signal comprises an identification of the asset; and
an asset communication device associated with the asset, wherein the asset communication device comprises a second transceiver and a second controller, wherein the second transceiver has a second range, wherein the asset communication device is within the first range, wherein the second controller receives, using the second transceiver, the first communication signal, wherein the second controller broadcasts, using the second transceiver, a second communication signal in response to the first communication signal, wherein the second communication signal comprises the identification of the asset,
wherein the first controller receives, using the first transceiver, the second communication signal,
wherein at least one of the first communication signal and the second communication signal is among a plurality of VLC signals.

2. The system of claim 1, wherein the second communication signal is among the plurality of VLC signals, wherein the second transceiver is integrated with a light source of the asset communication device.

3. The system of claim 1, further comprising:
a second VLC device comprising a third controller, a third transceiver, and a second light source, wherein the third transceiver has a third range, wherein the third controller broadcasts, using the third transceiver, a third communication signal, wherein the third communication signal comprises the identification of the asset,
wherein the asset communication device is within the third range, wherein the second controller receives, using the second transceiver, the third communication signal, wherein the second controller broadcasts, using the second transceiver, a fourth communication signal in response to the third communication signal, wherein the fourth communication signal comprises the identification of the asset,
wherein the third controller receives, using the third transceiver, the fourth communication signal,
wherein at least one of the third communication signal and the fourth communication signal is among the plurality of VLC signals.

4. The system of claim 3, wherein the first VLC device is within the third range, wherein the third controller of the second VLC device broadcasts, using the third transceiver, a fifth communication signal addressed to the first VLC device, wherein the fifth communication signal comprises the identification of the asset.

5. The system of claim 4, further comprising:
a third VLC device comprising a fourth controller, a fourth transceiver, and a third light source, wherein the third VLC device is within the first range but is outside the second range and the third range,
wherein the first controller broadcasts, using the first transceiver, a sixth communication signal comprising the identification of the asset.

6. The system of claim 5, further comprising:
an asset tracking manager communicably coupled to the third VLC device, wherein the asset tracking manager locates the asset using the sixth communication signal.

7. The system of claim 6, wherein the first VLC device and the second VLC device communicates, using a plurality of communication signals, with the asset communication device over a period of time, wherein the plurality of communication signals comprises the identification of the asset, wherein the asset tracking manager tracks movement of the asset over the period of time using the plurality of communication signals over the period of time.

8. An asset communication device associated with an asset, the asset communication device comprising:
a light source;
a controller that determines when to send a first visible light communication (VLC) signal;
a VLC signal generator coupled to the controller, wherein the VLC signal generator generates the first VLC signal based on instructions received from the controller; and
a transceiver coupled to the VLC signal generator, wherein the transceiver broadcasts the first VLC signal using the light source, wherein the first VLC signal comprises an identification of the asset,
wherein the first VLC signal is configured to be received by a first VLC device comprising a second transceiver, wherein the first VLC device can determine, based on the first VLC signal received by the VLC device, a location of the asset.

9. The asset communication device of claim 8, wherein the transceiver is configured to receive a communication signal, wherein the controller interprets the communication signal and generates the first VLC signal in response to the communication signal.

10. The asset communication device of claim 9, wherein the communication signal is a second VLC signal, wherein the second VLC signal is received, via the transceiver, by a VLC signal detector coupled to the controller.

11. The asset communication device of claim 9, wherein the communication signal is a radio frequency signal.

12. The asset communication device of claim 9, wherein the communication signal is addressed to the asset.

13. The asset communication device of claim 8, wherein the controller comprises a timer used to determine when to send the first VLC signal.

14. The asset communication device of claim 8, further comprising:
at least one sensor device that detects movement of the asset, wherein the controller directs the VLC signal generator to generate and send the first VLC signal based on the movement of the asset detected by the at least one sensor device.

15. The asset communication device of claim 14, wherein the controller determines, using the at least one sensor and a timer, a lack of movement of the asset for a period of time, wherein the controller directs the VLC signal generator to generate and send the first VLC signal based on the lack of movement of the asset, detected by the at least one sensor device, for the period of time, measured by the timer.

16. A visible light communication (VLC) device comprising:
a light source;
a controller that determines when to send a first visible light communication (VLC) signal;
a VLC signal generator coupled to the controller, wherein the VLC signal generator generates the first VLC signal based on instructions received from the controller; and
a transceiver coupled to the VLC signal generator, wherein the transceiver broadcasts the first VLC signal using the light source, wherein the first VLC signal is addressed to an asset and requests a return communication signal from the asset, wherein the transceiver is configured to receive the return communication signal, wherein the controller can determine, based on the return communication signal, a location of the asset.

17. The VLC device of claim 16, wherein the return communication signal is a second VLC signal, wherein the second VLC signal is received, via the transceiver, by a VLC signal detector coupled to the controller.

18. The VLC device of claim 16, wherein the return communication signal is a radio frequency signal.

19. The VLC device of claim 16, wherein the return communication signal is addressed from the asset.

20. The VLC device of claim 16, wherein the controller sends, using the VLC signal generator and the transceiver, a second VLC signal to an adjacent VLC device, wherein the second VLC signal comprises the location of the asset.

* * * * *